United States Patent [19]

Shinomiya et al.

[11] Patent Number: 5,303,231
[45] Date of Patent: Apr. 12, 1994

[54] SWITCH COUPLED BETWEEN INPUT AND OUTPUT PORTS IN COMMUNICATION SYSTEM

[75] Inventors: Tomohiro Shinomiya; Toshio Shimoe; Hiroshi Takeo, all of Kawasaki, Japan

[73] Assignees: Fujitsu Limited, Kawasaki; Nippon Telegraph and Telephone Corporation, Tokyo, both of Japan

[21] Appl. No.: 847,280

[22] Filed: Mar. 10, 1992

[30] Foreign Application Priority Data

Mar. 11, 1991 [JP] Japan .................................. 3-045037

[51] Int. Cl.$^5$ .............................................. H04L 12/54
[52] U.S. Cl. ..................................... 370/58.2; 370/60; 370/61
[58] Field of Search ............................ 370/58.2, 60, 61

[56] References Cited

U.S. PATENT DOCUMENTS

| | | | |
|---|---|---|---|
| 4,623,996 | 11/1986 | McMillen | 370/60 |
| 5,067,124 | 11/1991 | Killat et al. | 370/60 |
| 5,126,999 | 6/1992 | Munter et al. | 370/60 |
| 5,138,612 | 8/1992 | Keller et al. | 370/60 |

FOREIGN PATENT DOCUMENTS

| | | | |
|---|---|---|---|
| 0292962 | 11/1988 | European Pat. Off. | H04L 11/20 |
| 0362723 | 4/1990 | European Pat. Off. | H04L 12/56 |
| 87/07462 | 12/1987 | World Int. Prop. O. | H04N 7/14 |

OTHER PUBLICATIONS

Patent Abstracts of Japan, vol. 15, No. 135 (E-1052), Apr. 4, 1991 & JP-A-3-16348 dated Jan. 24, 1991.

*Primary Examiner*—Douglas W. Olms
*Assistant Examiner*—Russell W. Blum
*Attorney, Agent, or Firm*—Staas & Halsey

[57] ABSTRACT

A switch includes a plurality of memories respectively having write terminals connected to input ports and output terminals, each of the memories including an input acknowledgement signal generating block for generating an input acknowledgement signal when data is received thereto. A multiplexer, which is coupled between the read terminals of the memories and an output port, connects one of the memories to the output port in response to a port number signal. An output controller, which is coupled to the memories and the multiplexer, receives the input acknowledgement signal from each of the memories in order of receipt and generating the port number signal so that data stored in the memories is selected by the multiplexer in order of receipt of the input acknowledgement signal.

6 Claims, 13 Drawing Sheets

SWITCH COUPLED BETWEEN INPUT AND OUTPUT PORTS IN COMMUNICATION SYSTEM

BACKGROUND OF THE INVENTION (1) Field of the Invention

The present invention generally relates to cross-point type switches used in an ATM (Asynchronous Transfer Mode) system or a high-bit-rate packet communication system of a broadband ISDN (Integrated Services Digital Network). More specifically, the present invention is concerned with an arrangement for controlling a switching operation on a switch, such as a cross-point type switch, so that input data are switched in order of receipt of the input data.

(2) Description of the Prior Art

FIG. 1 shows a conventional cross-point type switch. The cross-point type switch shown in FIG. 1 is composed of an input port group 1 having N input ports (N is an integer larger than 2), an output port group 2 having N output ports, a memory 3, N route setting units 4, and an output controller 8. Memories are arranged in rows and columns. More specifically, the memories are provided at cross points of input lines running in the row direction and output lines running in the column direction. Each of the memories may comprise for example, an FIFO (First-In First-Out) memory.

The routing units 4 receive data, such as ATM data, received via the input port group 1, and determine paths to which the received data should be output. For example, if data received via the input port #1 is requested to be transferred to the output port #2, the received data is stored in the memory located at the cross point of the input line connected to input port #1 and the output line connected to output port #2. The output controller 8 controls the memory 3 so that each of the output lines connected to the output port 2 carries, at one time, only one data block (i.e., a cell or packet) transferred from any one of input ports #1-#N. That is, the output controller 8 prevents two or more data blocks from being transferred to one of the output lines at one time.

FIG. 2 shows a procedure by which the output controller 8 controls the memory 3. More specifically, FIG. 2 shows N FIFO memories $3_{11}-3_{1N}$ arranged in the first column, an output-port controller $8_1$, which, a part of the output controller 8, and a multiplexer 25. The FIFO memories $3_{11}-3_{1N}$ are connected to the multiplexer 25, which is connected to output port #1. When each of the FIFO memories $3_{11}-3_{1N}$ receives data to be transferred to the corresponding output port, each FIFO memory sets an empty flag EF to zero when the FIFO memory has been filled with data and there is no available storage area therein. It will now be assumed that the controller $8_1$ controls the memories $3_{11}-3_{1N}$ so that data is transferred to the multiplexer 25. The controller $8_1$ sequentially determines whether or not the empty flags EF received from the FIFO memories $3_{11}-3_{1N}$ are equal to zero. Then the controller $8_1$ controls the multiplexer 25 so that data from the FIFO memories from which the empty flags EF are equal to zero have been output and sequentially transferred to output port #1.

However, the conventional memory control procedure has the following disadvantages. The controller $8_1$ sequentially accesses input ports #1-#N one by one, in sequential order, to determine whether or not the FIFO memory being accessed has any available storage area. It should be noted that the above sequential access to the FIFO memories is carried out without considering how full each FIFO memory is. Hence, there is a possibility that some FIFO memories connected to a certain output port are full and hence it takes a long time to read out all the data therefrom.

SUMMARY OF THE INVENTION

It is a general object of the present invention to provide a switch in which the above disadvantages are eliminated.

A more specific object of the present invention to provide a switch in which data temporarily stored in memories located at the cross points can be efficiently read out therefrom.

The above objects of the present invention are achieved by a switch comprising a plurality of memories respectively having write terminals connected to input ports and output terminals, each of the memories including an input acknowledgement signal generating block for generating an input acknowledgement signal when data is received thereto. A multiplexer, which is coupled between the read terminals of the memories and an output port, connects one of the memories to the output port in response to a port number signal. An output controller, which is coupled to the memories and the multiplexer, receives the input acknowledgement signal from each of the memories in order of receipt and generates the port number signal so that data stored in the memories is selected by the multiplexer in the order of receipt of the input acknowledgement signal.

BRIEF DESCRIPTION OF THE DRAWINGS

Other objects, features and advantages of the present invention will become more apparent from the following detailed, description when read in conjunction with the accompanying drawings, in which.

DESCRIPTION OF THE PREFERRED EMBODIMENTS

Figure 1:
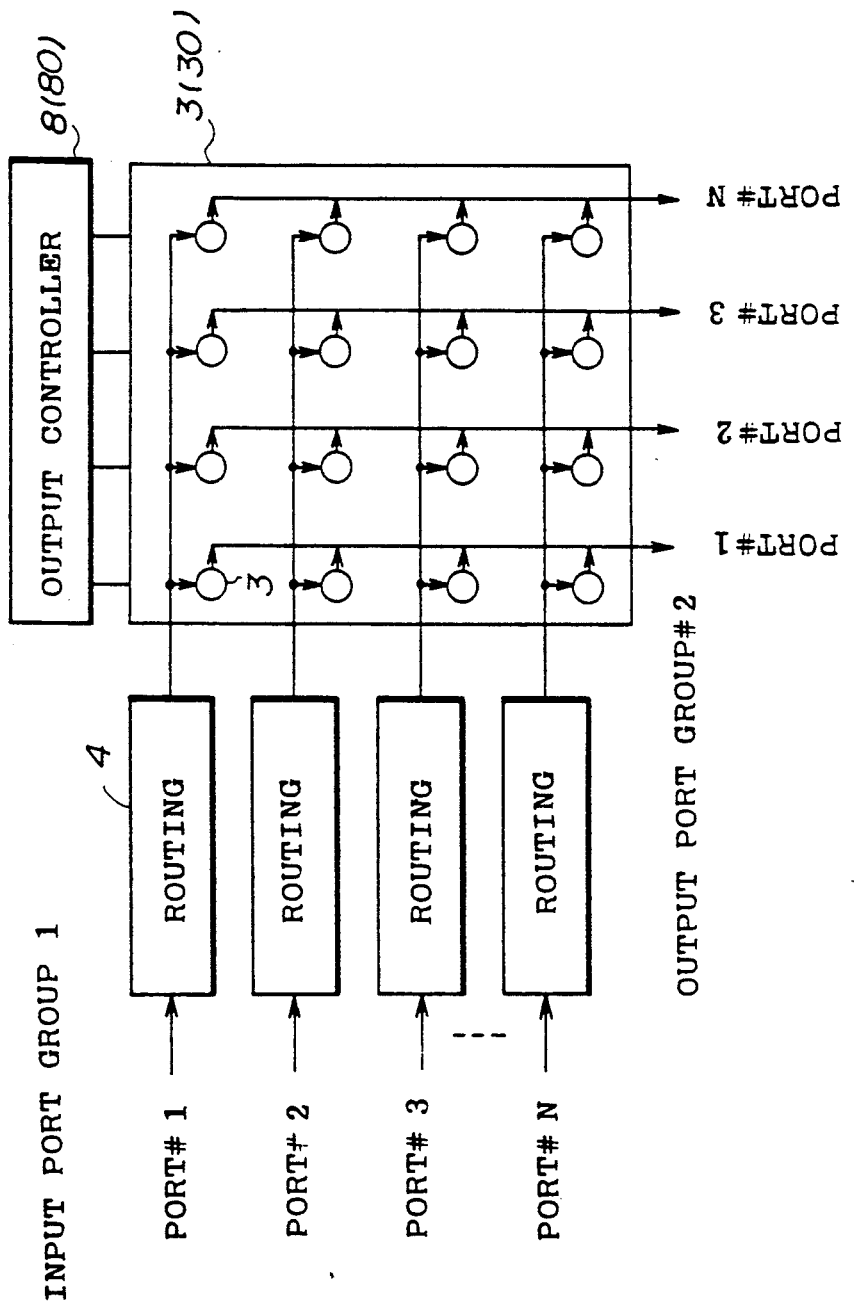
FIG. 1 is a block diagram of a conventional cross-point type switch.
Figure 2:
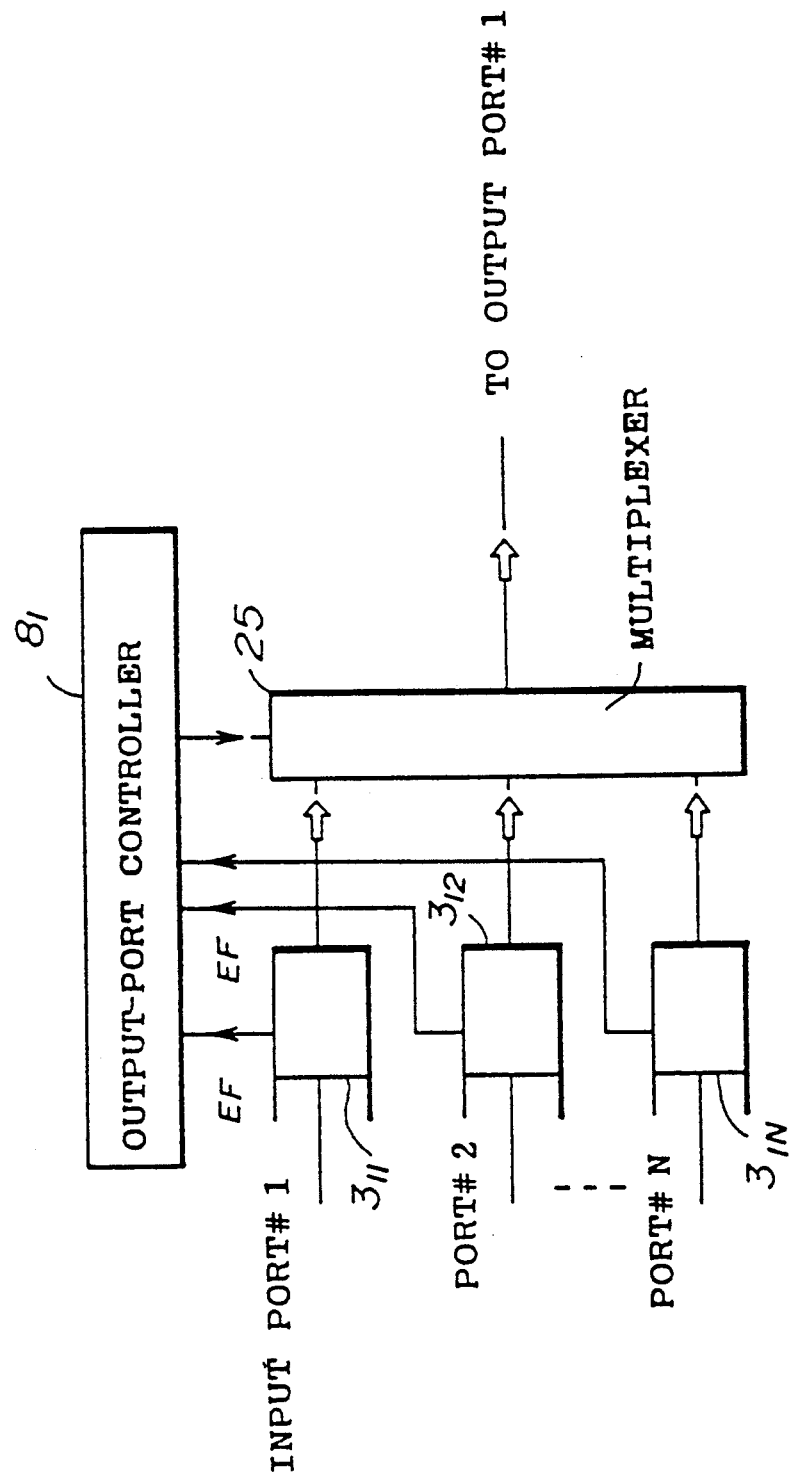
FIG. 2 is a block diagram showing a part of the switch shown in FIG. 1 related to output port #1.

The generalized block structure of the present invention is as shown in FIG. 1. That is, the present invention includes a memory 30, an output controller 80, and route setting units 4. The memory of the present invention is indicated by a reference numeral "30", and the output controller thereof is indicated by a reference numeral "80".

Figure 3:
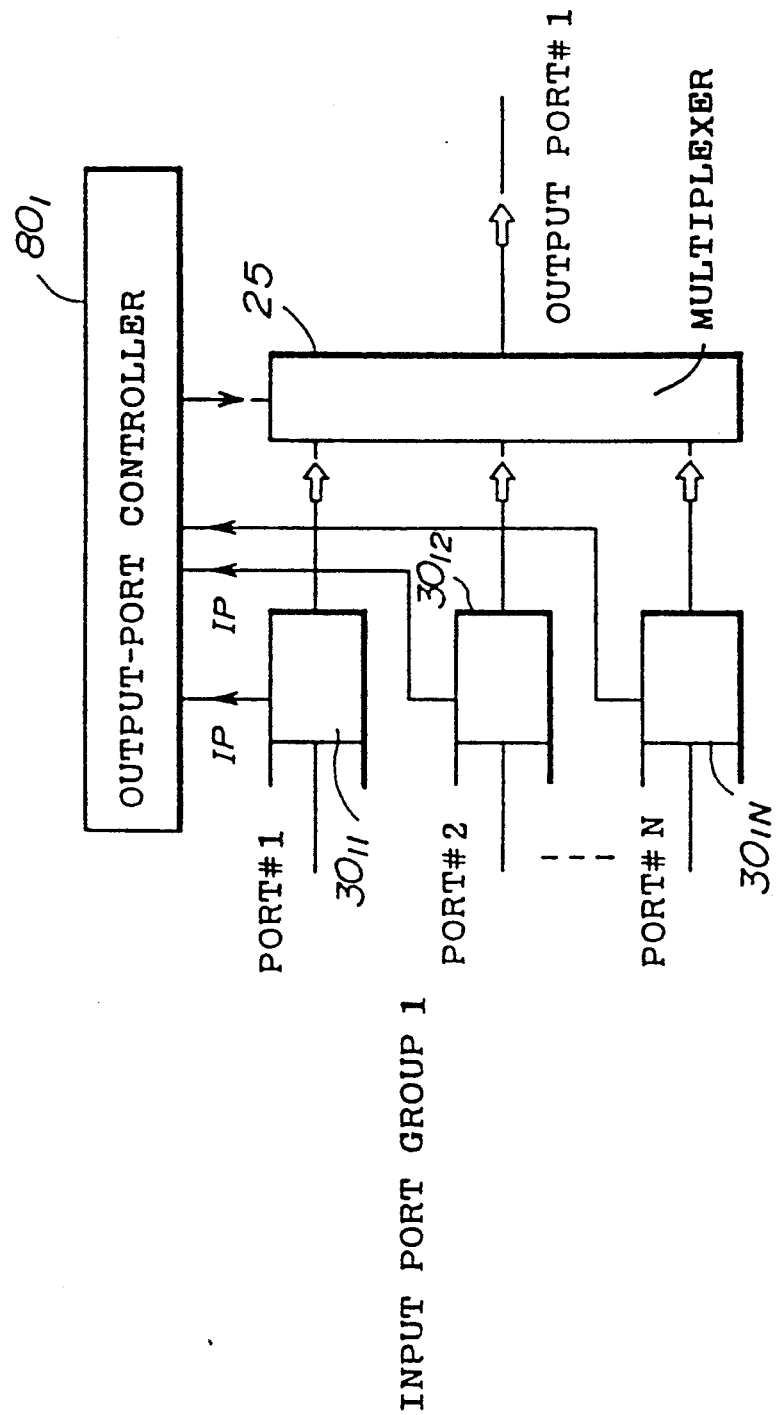
FIG. 3 is a block diagram showing an outline of the present invention.

FIG. 3 is a block diagram of a part of the switch of the present invention. In FIG. 3, a part of the memory 30 related to output port, and an output-port-#1 controller $80_1$, which is a part of the output controller 80, is illustrated. The memory 30 includes FIFO memories $30_{11}$-$30_{1N}$ connected to output port #1. The output port controller $80_1$ receives an input data existence/non-existence signal IP, which is generated by each of the FIFO memories $30_{11}$-$30_{1N}$ each time data is received therein. Hereinafter, the input data existence/non-existence signal IP is simply referred to as an input acknowledgement signal IP. In this manner, the output controller 80 receives the input acknowledgement signals IP from all the FIFO memories, the latter arranged in rows and columns, and puts them in receiving order. The controller $80_1$ controls the multiplexer 25 on the basis of the input acknowledgement signals IP from the FIFO memories $30_{11}$-$30_{1N}$ so that data stored therein are read out in receiving order. The controller $80_1$ outputs the oldest input acknowledgement signal IP to the multiplexer 25, which selects the FIFO memory related to the oldest input acknowledgement signal IP and passes data read out therefrom to output port #1. As a result, the aforementioned problem in which data continuously remain in the FIFO memories for a long time is avoided.

Figure 4:
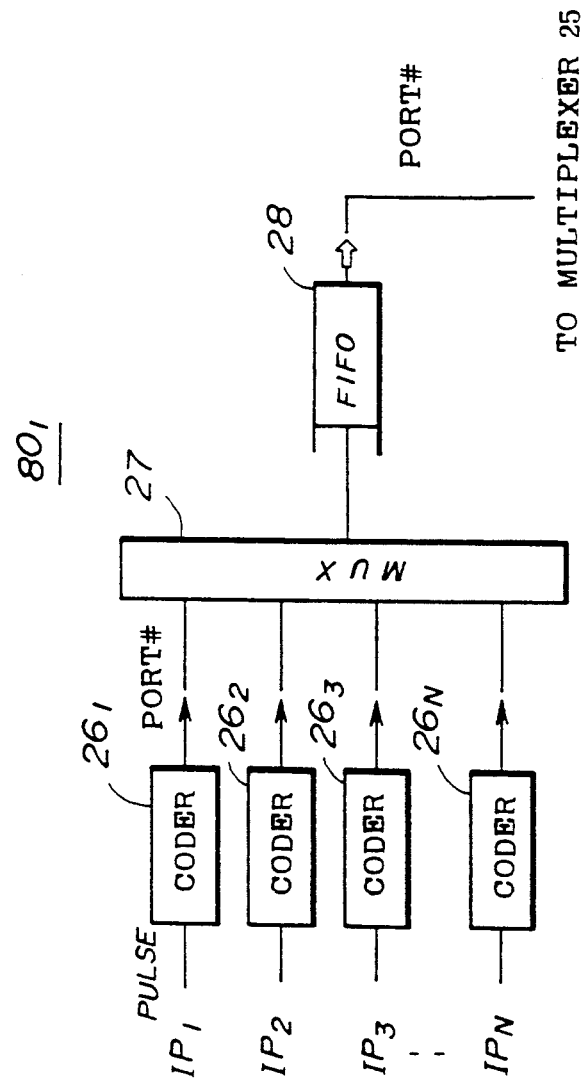
FIG. 4 is a block diagram of a first embodiment of the present invention.

FIG. 4 shows a first embodiment of the present invention. The structure shown in FIG. 4 is a part of the output controller 80, and corresponds to the controller $80_1$. The controller $80_1$ is composed of coders $26_1$-$26_N$, a multiplexer 27 and an order control memory comprising, for example, an FIFO memory 28. The coders $26_1$-$26_N$ receive the input acknowledgement signals $IP_1$-$IP_N$ and convert them into the corresponding port numbers. For example, when the coder $26_1$ receives the input acknowledgement signal IP1, it generates the input port number indicating port #1. The multiplexer 27 receives the port numbers from the coders $26_1$-$26_N$ and multiplexes them (outputs the port numbers one by one). The order control memory 28 stores the port numbers from the multiplexer 27 in receiving order.

The port numbers sequentially stored in the order control memory 28 are sequentially output to the multiplexer 25 shown in FIG. 3. In other words, the port numbers are written into the order control memory 28 and read out therefrom by the first-in first-out procedure. In response to the port number, the multiplexer 25 selects the corresponding FIFO memory and transfers data stored therein to the corresponding output port (#1 in the case shown in FIG. 3). The number of bits required for forming the input port number depends on the number of input ports. If 128 input ports are used, the port number is described by seven bits.

In the structure shown in FIG. 4, if some of the coders $26_1$-$26_N$ simultaneously output the port numbers to the multiplexer 27, the multiplexer 27 processes these port numbers one by one in a predetermined sequence, for example, an increasing order of port number. That is, the priority becomes higher as the port number decreases.

Figure 5:
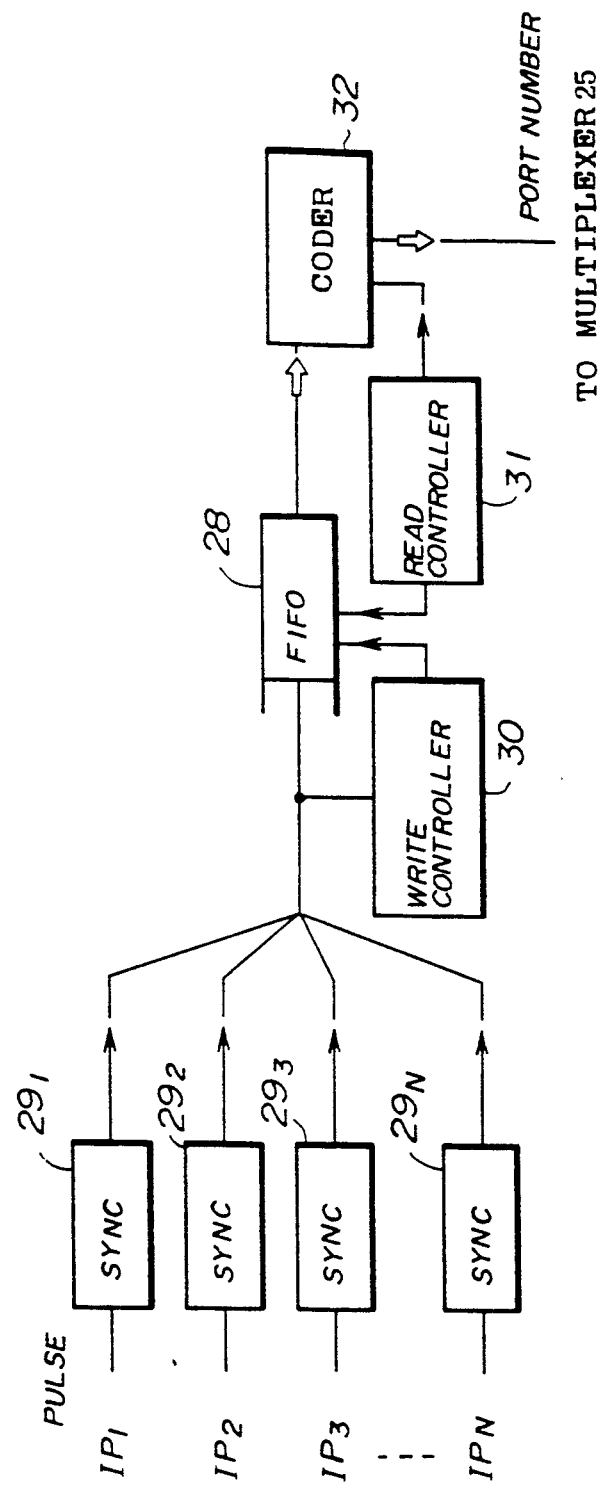
FIG. 5 is a block diagram of a second embodiment of the, present invention.

FIG. 5 is a block diagram of the controller $80_1$ according to a second embodiment of the present invention. In FIG. 5, parts which are the same as those shown in the previously described figures are given the same reference numerals. The controller $80_1$ shown in FIG. 5 includes timing controllers $29_1$-$29_N$, a write controller 30, a read controller 31 and a coder 32 in addition to the above-mentioned order control memory 28. The timing controllers $29_1$-$29_N$ synchronize the input acknowledgement signals $IP_1$-$IP_N$ with each other. The synchronized input acknowledgement signals $IP_1$-$IP_N$, which are arranged, for example, in parallel, are applied to the order control memory 28 and the write controller 30. The synchronized input acknowledgement signals $IP_1$-$IP_N$ are sequentially written into the FIFO memory under the control of the write controller 30.

When each of the input acknowledgement signals $IP_i$ (i=1, 2, ..., N) is equal to 1, it shows that the corresponding FIFO memory stores data which should be transferred to the input corresponding input port. When each of the input acknowledgement signals $IP_i$ is equal to 0, it shows that the corresponding FIFO memory does not store data. In this case, the synchronized input acknowledgement signals $IP_1$-$IP_N$ arranged in parallel are as follows:

"100111100...".

This N-bit data train is written into the order control memory 28. The position of each bit of the N-bit data train corresponds to the port number. For example, the beginning bit of the N-bit data train corresponds to input port #1. If all the bits are zeros, the write controller 30 inhibits such data from being written into the order control memory 28.

The read controller 31 sequentially reads out the N-bit data train from the order control memory 28, and outputs it to the coder 32. The coder 32 receives each bit "1" contained in the N-bit data train and generates the corresponding port number. The multiplexer 25 selects the FIFO memory connected to the output port specified by the port number, and transfers the data read out therefrom to the output port.

Figure 6:
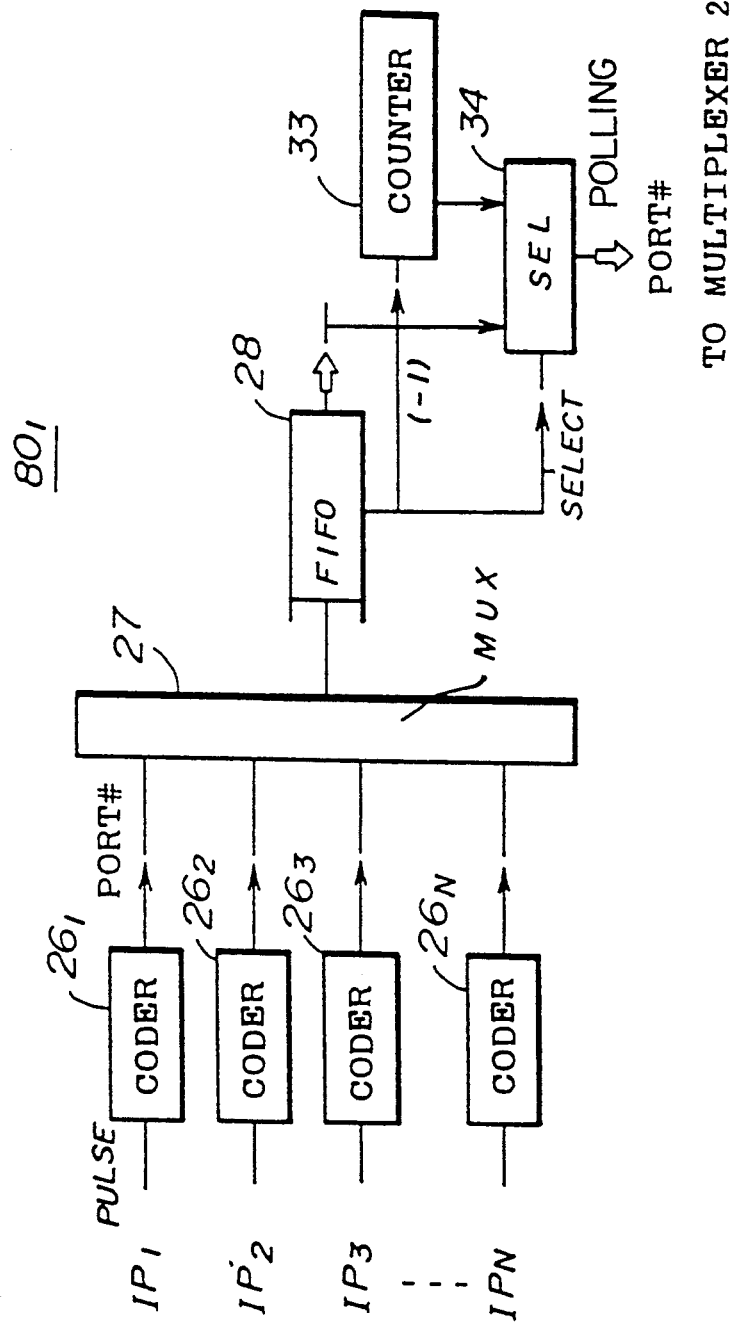
FIG. 6 is a block diagram of a third embodiment of the present invention.

FIG. 6 shows a third embodiment of the present invention. In FIG. 6, parts which are the same as those shown in FIG. 4 are given the same reference numerals The control part $80_1$ shown in FIG. 6 includes a counter 33 and a selector 34 in addition to the coders $26_1$-$26_N$, the multiplexer 27 and the order control memory 28. The counter 33 increments its counter value by 1 in response to an increment signal when there is no port number stored in the order control memory 28. The incremented counter value is output to the selector 34, which outputs the incremented counter value to the multiplexer 25 by a polling process. The incremented counter number serves as the port number. Normally, no data is read out from the FIFO memory specified by the incremented counter number, because the incremented counter number is generated when there is no data stored in the FIFO memories $30_{11}$-$30_1$ (FIG. 3). However, there is a possibility that data may be stored in some FIFO memories in some cases, such that the input acknowledgement signal $IP_i$ was not generated due to a certain cause, or the coder 26 did not generate the port number. The above polling process is effective to such cases. The FIFO memories $30_{11}$-$30_1$ are sequentially accessed by the polling process.

The selector 34 selects either the port number read out from the order control memory 28 or the port number (counter value) output by the counter 33. When the incremented signal is output from the order control memory 28, the selector 34 selects the counter 33.

Figure 7:
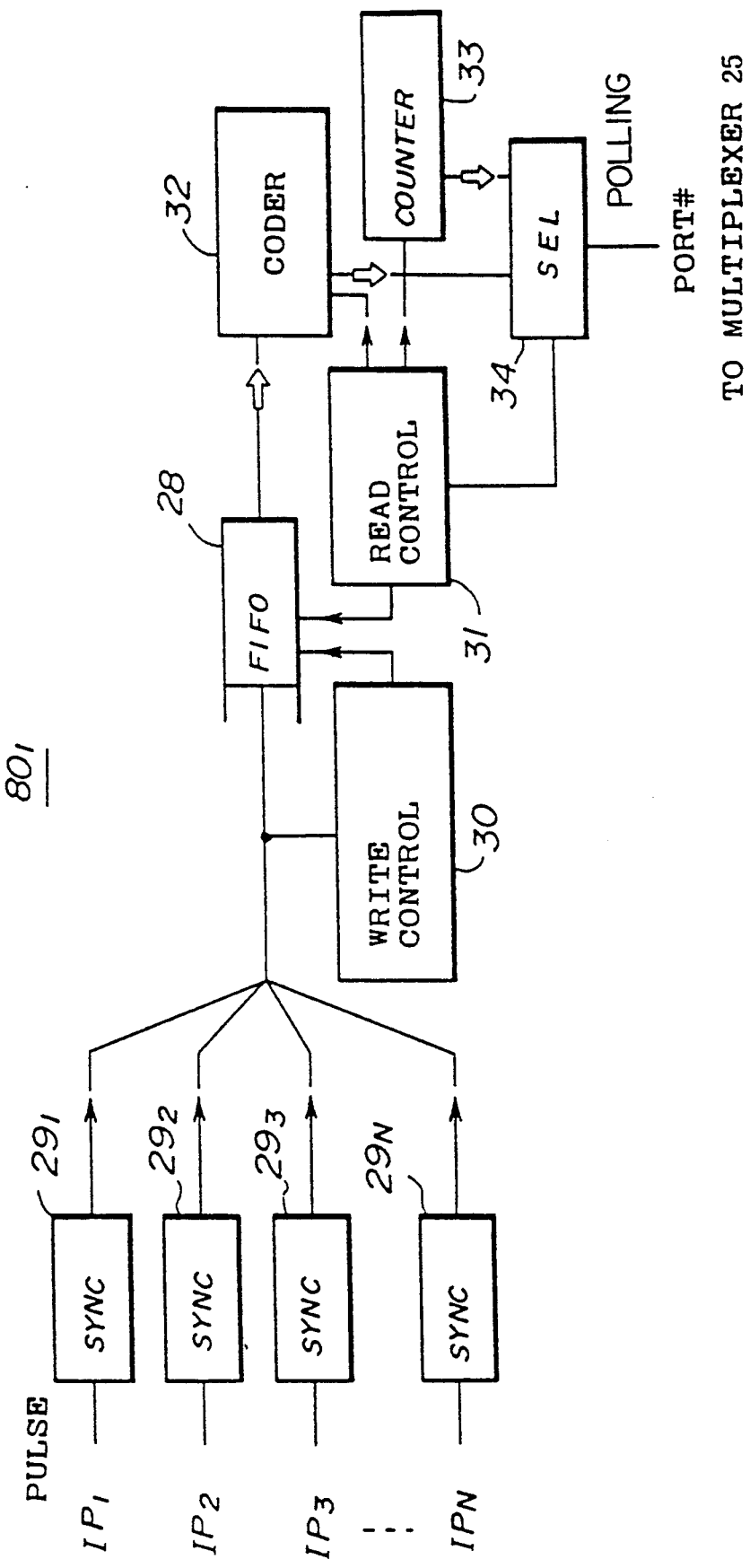
FIG. 7 is a block diagram of a fourth embodiment of the present invention.

FIG. 7 shows a fourth embodiment of the present invention. In FIG. 7, parts which are the same as those shown in the previously described figures are given the same reference numerals. The fourth embodiment shown in FIG. 7 is obtained by adding the polling process used in the third embodiment shown in FIG. 6 to the structure of the second embodiment shown in FIG. 5. That is, the counter 33 and the selector 34 as shown in FIG. 6 are added to the structure shown in FIG. 5. When there is no data in the order control memory 28, the increment signal is output to the counter 33 via the read controller 31. The counter 33 increments its counter value by 1, and the selector 34 selects the incremented counter value output by the counter 33.

Figure 8:
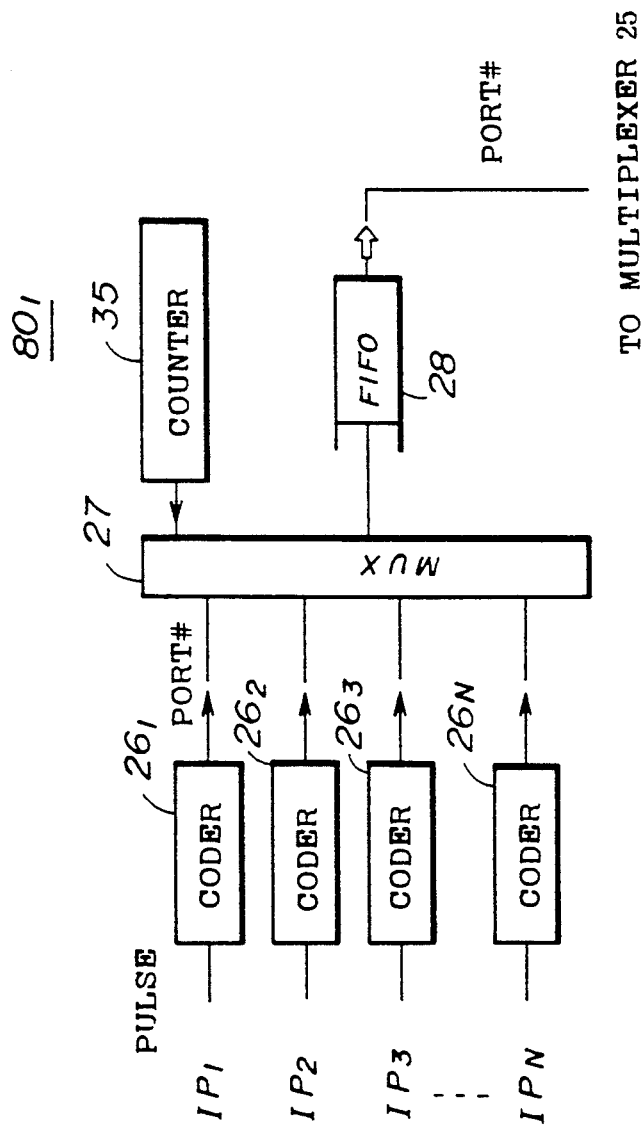
FIG. 8 is a block diagram of a fifth embodiment of the present invention.

FIG. 8 shows a fifth embodiment of the present invention. In FIG. 8, parts which are the same as those shown in the previous figures are given the same reference numerals. The structure shown in FIG. 8 is obtained by adding a counter 35 to the structure shown in FIG. 4. The basic operation of the controller $80_1$ is the same as that of the controller $80_1$ shown in FIG. 4. As has been described previously, if some of the coders $26_1$–$26_N$ output the port numbers to the multiplexer 27 at the same time, the multiplexer 27 processes these port numbers one by one in the predetermined sequence or priority.

The counter 35 is a cyclic counter, which sequentially and periodically generates the port numbers of the input ports #1-#N by periodically increasing the counter number by a predetermined number. The multiplexer 27 compares the counter value of the counter 35 with the port numbers simultaneously received from the coders $26_1$–$26_N$. The multiplexer 27 selects the port number which is closest to the counter value. That is, the highest priority is assigned to the port number closet to the counter value. In the above manner, the priority of selection in the multiplexer 27 is sequentially varied based on the counter value of the counter 35.

Figure 9:
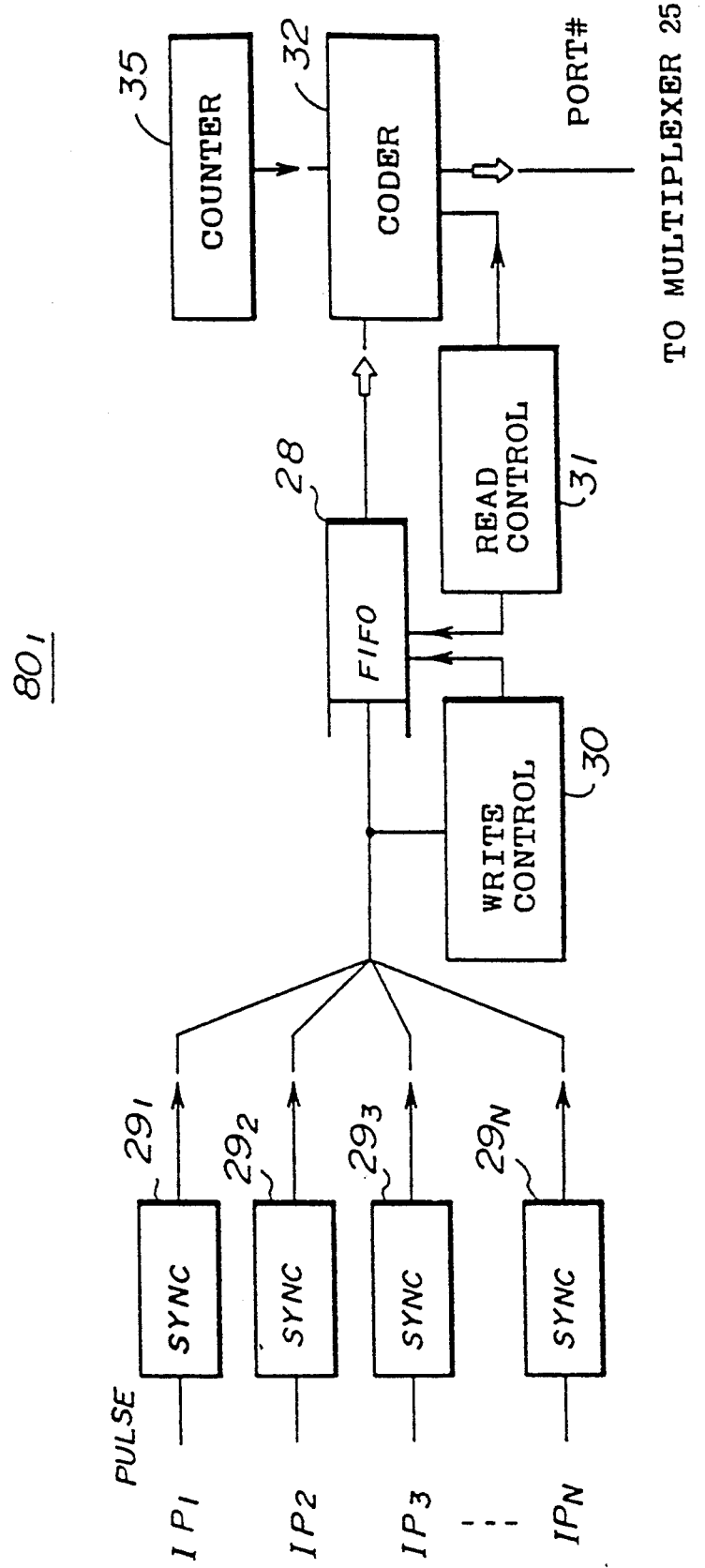
FIG. 9 is a block diagram of a sixth embodiment of the present invention.

FIG. 9 shows a sixth embodiment of the present invention. In FIG. 9, parts which are the same as those shown in the previous figures are given the same reference numerals. The sixth embodiment shown in FIG. 9 is obtained by adding the counter 35 shown in FIG. 8 to the structure shown in FIG. 5. The counter 35 shown in FIG. 8 is connected to the coder 32. The basic operation of the sixth embodiment is the same as the operation of the structure shown in FIG. 5. The counter 35 cyclically increments its counter value, which is converted by the coder 32. The input port number closet to the counter value is given the highest priority. Since the counter value is incremented, the reference value for selecting one of the input port numbers which are simultaneously generated is changed.

Figure 10:
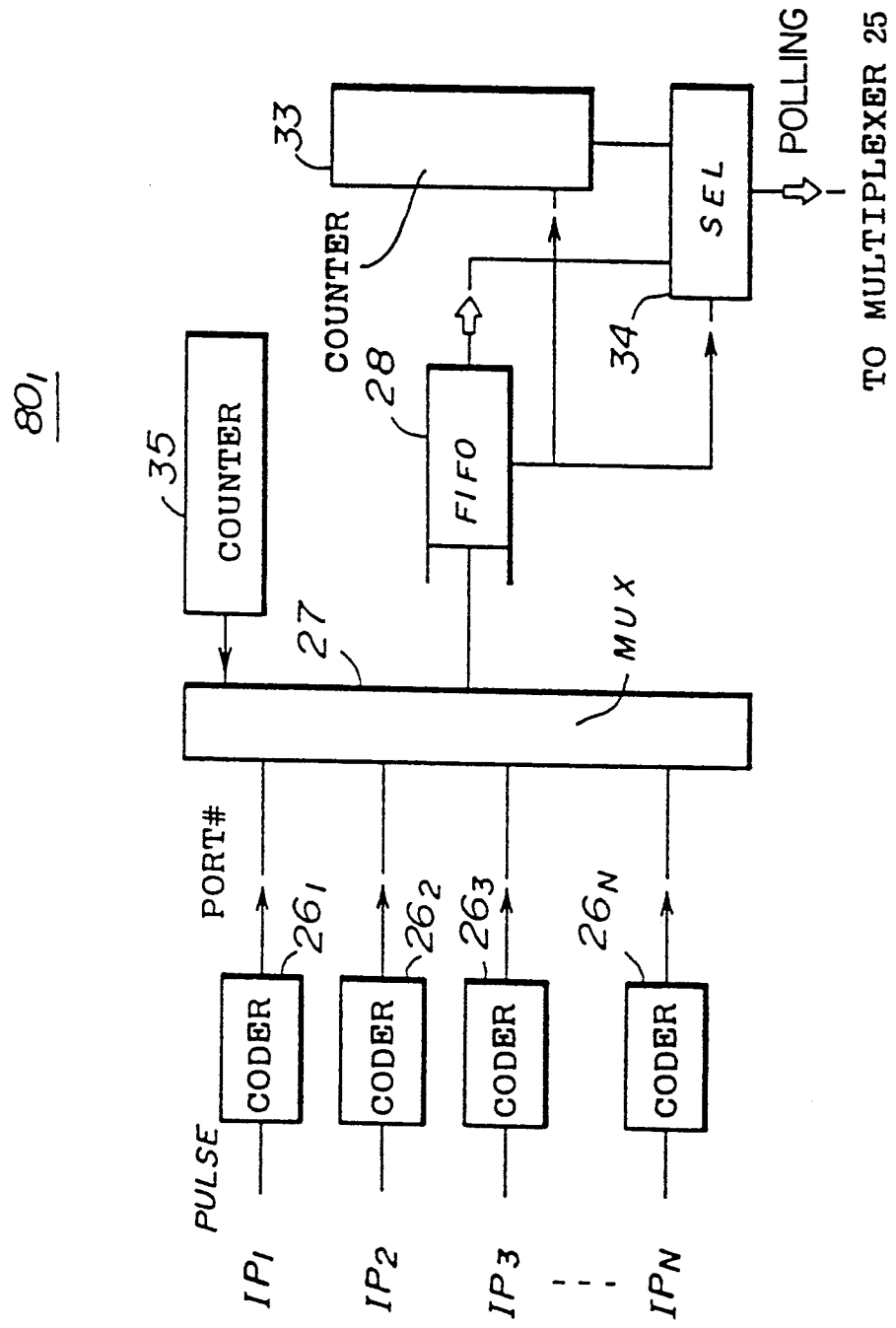
FIG. 10 is a block diagram of a seventh embodiment of the present invention.

FIG. 10 shows a seventh embodiment of the present invention. In FIG. 10, parts which are the same as those shown in the previous figures are given the same reference numerals. The structure shown in FIG. 10 is obtained by adding the counter 35 to the structure shown in FIG. 6.

Figure 11:
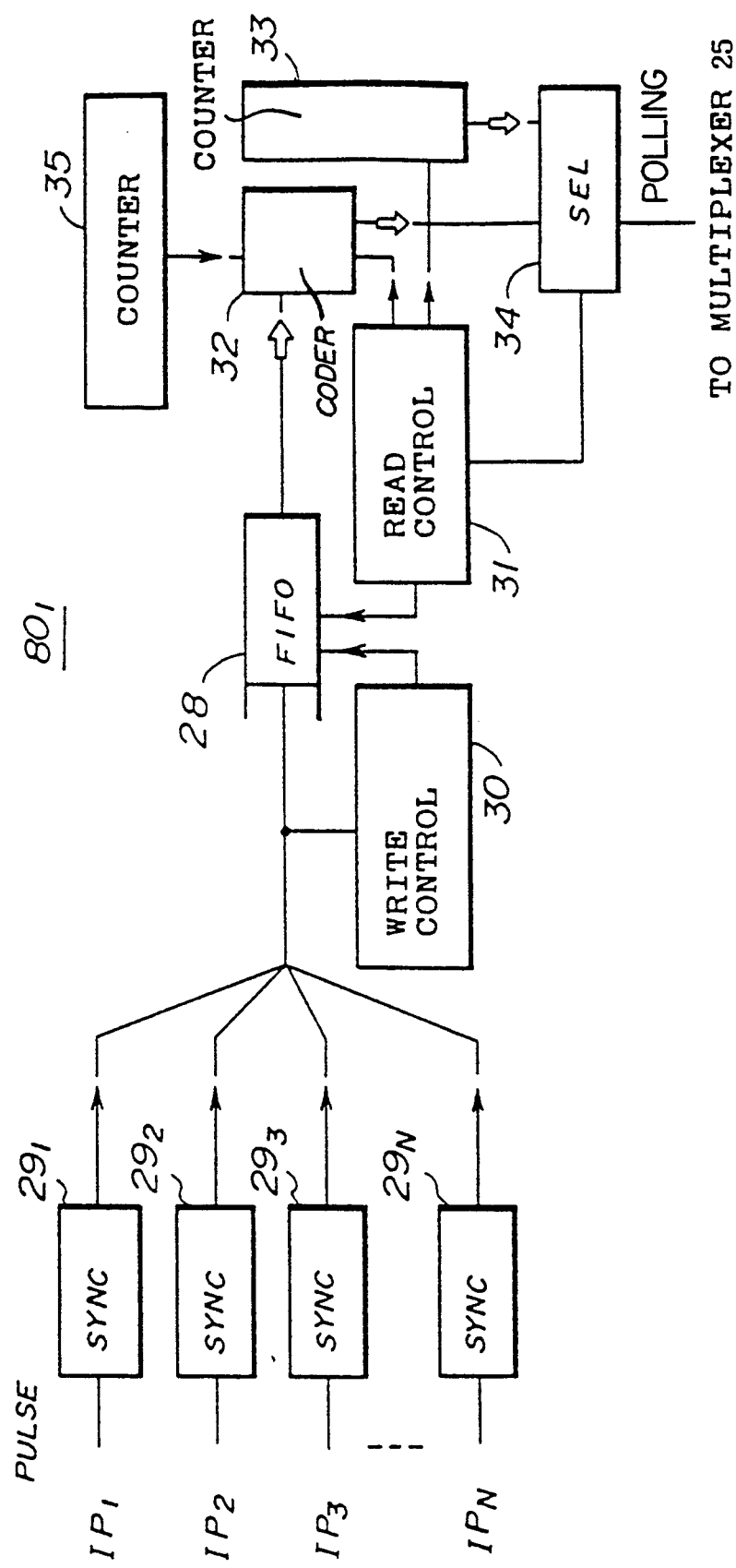
FIG. 11 is a block diagram of an eighth embodiment of the present invention.

FIG. 11 shows an eighth embodiment of the present invention. In FIG. 11, parts which are the same as those shown in the previous figures are given the same reference numerals. The structure shown in FIG. 11 is obtained by adding the counter 35 to the structure shown in FIG. 7.

Figure 12:
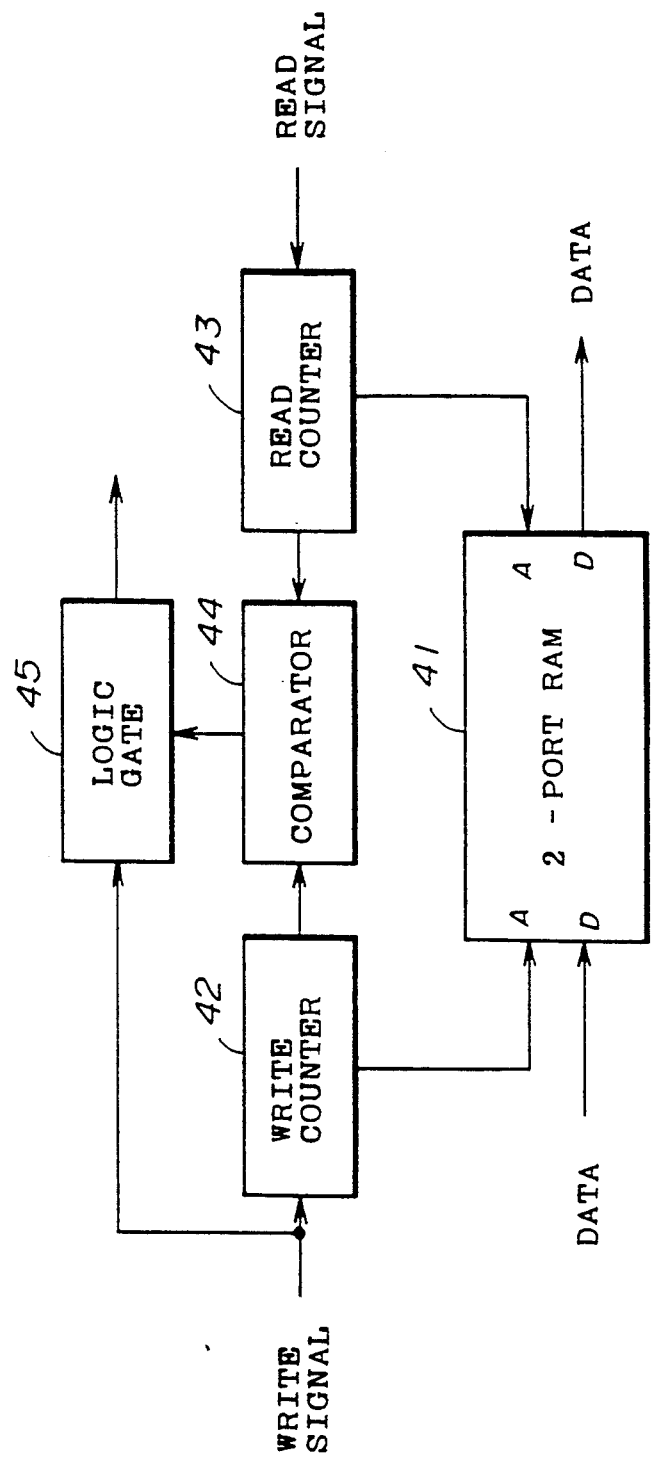
FIG. 12 is a block diagram showing the structure of each FIFO memory provided at each cross point.

Each of the FIFO memories provided at the cross points of the memory is configured as shown in FIG. 12. As shown in FIG. 12, each of the FIFO memories $30_{11}$–$30_{1N}$ is formed with a dual-port memory, which is composed of a two-port RAM 41, a write counter 42, a read counter 43, a comparator 44 and a logic gate 45. The two-port RAM 41 receives data via a data input terminal D, and outputs data via a data output terminal D. A write signal is applied to the write counter 42, which generates a write address. A read signal is applied to the read counter 43, which generates a read address. The write address is applied to a write address terminal A of the two-port RAM 41, the two-port RAM 41 receiving the read address via a read address terminal A. Normally, the write address proceeds to the read address. The comparator 44 compares the write address and the read address with each other, and outputs a full flag signal to the logic gate 45. The full flag signal switches to a low level from a high level when the two-port RAM 41 has become filled with data. The logic gate 45 comprises an AND gate. When the write signal is applied to the write counter 42 in the state where the two-port RAM 41 has not yet been filled with data, the input acknowledgement signal $IP_i$ is generated by the logic gate 45.

Figure 13:
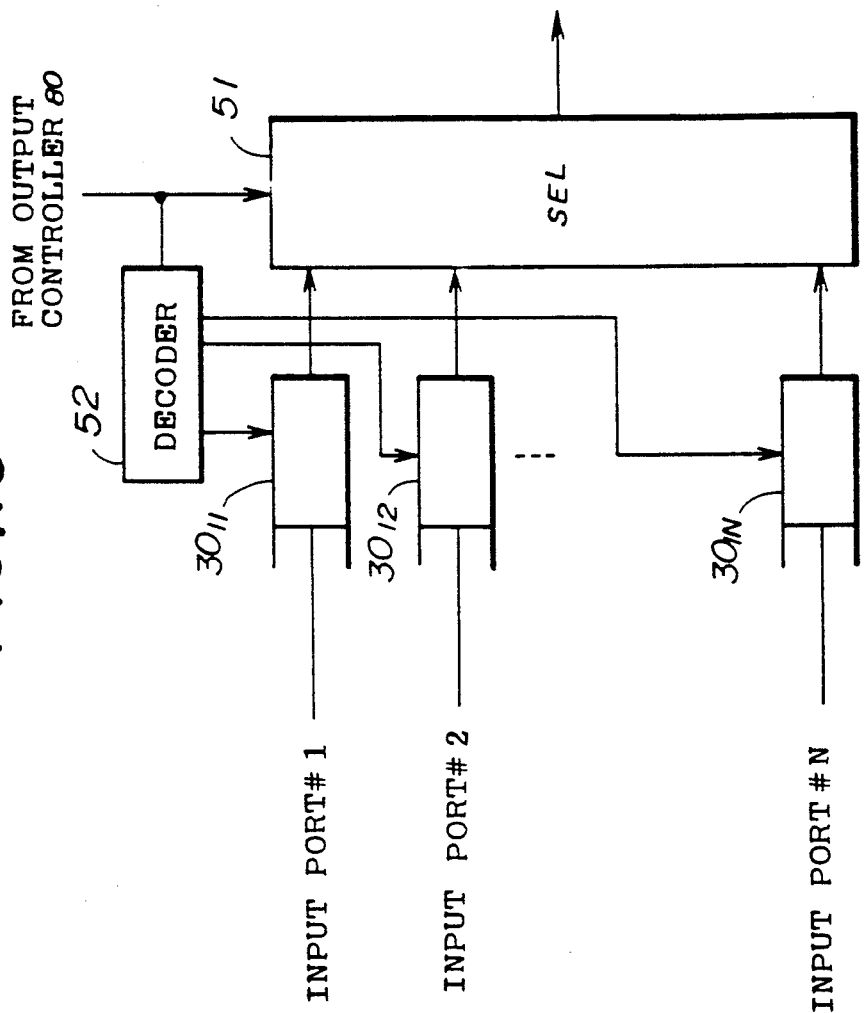
FIG. 13 is a block diagram of a multiplexer shown in FIG. 3.

FIG. 13 shows the multiplexer 25 shown in FIG. 3. The multiplexer 25 is composed of a selector 51 and a decoder 52. The port number output by the output controller 80 is applied to the selector and the decoder 52. The selector 52 selects the FIFO memory specified by the received port number. The decoder 52 decodes the received port number and generates a read signal which should be applied to the FIFO memory connected to the selected input port. The read signal thus generated is applied to, for example, the read counter 43.

The present invention is not limited to the specifically disclosed embodiments, and variations and modifications may be made without departing from the scope of the invention.

What is claimed is:

1. A switch having plural input ports and which selectively switches input data, received at a corresponding one of said input ports to an output port, said switch comprising:

a plurality of memories respectively connected to corresponding ones of said input ports of the switch, each of said memories comprising input acknowledgement signal generating means for generating an input acknowledgement signal in response to receipt of said input data;

multiplexer means, coupled between the plurality of memories and the output port of the switch, for connecting one of the memories to the output port in response to a port number signal;

coder means for receiving said input acknowledgement signal from each of the memories and for generating the port number signal indicating one of the memories which has received said input data each time the input acknowledgement signal is received;

order control memory means, coupled between said coder means and said multiplexer means, for storing the port number signal generated each time one of the input acknowledgement signals is generated and outputting the port number signal to said multiplexer means by a first-in first-out process;

counter means, coupled to said order control memory means for generating a counter number which is incremented when there is no data in said order control memory means, said counter number serving as the port number signal; and selector means, coupled to said order control memory means, said counter means and said multiplexer means, for outputting the port number signal from said order control memory means to said multiplexer means when said order control memory means stores the port number signal, and for outputting the counter number from said counter means when there is no data in said other control memory means.

2. A switch having plural input ports and which selectively switches input data, received at a corresponding one of said input ports to an output port, said switch comprising:

a plurality of memories respectively connected to corresponding ones of said input ports of the switch, each of said memories comprising input acknowledgement signal generating means for generating an input acknowledgement signal in response to receipt of said input data;

multiplexer means, coupled between the plurality of memories and the output port of the switch, for connecting one of the memories to the output port in response to a port number signal;

synchronizing means for synchronizing said input acknowledgement signals from the memories with each other, and for outputting synchronized input acknowledgement signals;

order control memory means, coupled to said synchronizing means, for storing the synchronized input acknowledgement signals and outputting the synchronized input acknowledgement signals by a first-in first-out process;

coder means, coupled between said order control memory means and said multiplexer means, for sequentially generating the port number signal indicating one of the memories each time one of the synchronized input acknowledgement signals is read out from said order control memory means;

counter means, coupled to said order control memory means, for generating a counter number which is incremented when there is no data in said order control memory means, said counter number serving as the port number signal; and selector means, coupled to said order control memory means, said counter means and said multiplexer means, for outputting the port number signal from said coder means to said multiplexer means when said order control memory means stores the port number signal, and for outputting the counter number from said counter means when there is no data in said other control memory means.

3. A switch having plural input ports and which selectively switches input data, received at a corresponding one of said input ports to an output port, said switch comprising:

a plurality of memories respectively connected to corresponding ones of said input ports of the switch, each of said memories comprising input acknowledgement signal generating means for generating an input acknowledgement signal in response to receipt of said input data;

multiplexer means, coupled between the plurality of memories and the output port of the switch, for connecting one of the memories to the output port in response to a port number signal;

coder means for receiving said input acknowledgement signal from each of the memories, and for generating the port number signal indicating one of the memories which has received data each time one of the input acknowledgement signals is received by said one of the memories;

order control memory means, coupled between said coder means and said multiplexer means, for storing the port number signal generated each time one of the input acknowledgement signals is generated and outputting the port number signal to said multiplexer means by a first-in first-out process; and counter means, operatively coupled to said order control memory means, for generating a cyclic counter value which periodically indicates one of the input ports, and for writing the cyclic counter value into said order control memory means;

wherein when said order control memory means simultaneously receives a plurality of port number, said order control memory means outputs said simultaneously received plurality of port numbers in response to said cyclic counter value.

4. A switch having plural input ports and which selectively switches input data, received at a corresponding one of said input ports to an output port, said switch comprising:

a plurality of memories respectively connected to corresponding ones of said input ports of the switch, each of said memories comprising input acknowledgement signal generating means for generating an input acknowledgement signal in response to receipt of said input data;

multiplexer means, coupled between the plurality of memories and the output port of the switch, for connecting one of the memories to the output port in response to a port number signal;

synchronizing means for synchronizing said input acknowledgement signals from the memories with each other, and for outputting synchronized input acknowledgement signals;

order control memory means, coupled to said synchronizing means, for storing the synchronized input acknowledgement signals and outputting the synchronized input acknowledgement signals by a first-in first-out process;

coder means, coupled between said order control memory means and said multiplexer means, for sequentially generating the port number signal indicating one of the memories each time one of the synchronized input acknowledgement signals is read out from said order control memory means;

counter means, coupled to said coder means, for generating a cyclic counter value which periodically indicates one of the input ports, and for outputting the cyclic counter value to said coder means;

wherein when said order control memory means simultaneously receives a plurality of port numbers, said order control memory means outputs said simultaneously received plurality of port numbers in response to said cyclic counter value from said coder means.

5. A switch having plural input ports and which selectively switches input data, received at a corresponding one of said input ports to an output port, said switch comprising:

a plurality of memories respectively connected to corresponding ones of said input ports of the switch, each of said memories comprising input acknowledgement signal generating means for generating an input acknowledgement signal in response to receipt of said input data;

multiplexer means, coupled between the plurality of memories and the output port of the switch, for connecting one of the memories to the output port in response to a port number signal;

coder means for receiving said input acknowledgement signal from each of the memories, and for generating the port number signal indicating one of the memories which has received data each time one of the input acknowledgement signals is received;

order control memory means, coupled between said coder means and said multiplexer means, for storing the port number signal generated each time one of the input acknowledgement signals is generated and outputting the port number signal to said multiplexer means by a first-in first-out process;

first counter means, coupled to said order control memory means, for generating a first counter number which is incremented when there is not data in said order control memory means, said first counter number serving as the port number signal;

selector means, coupled to said order control memory means, said first counter means and said multiplexer means, for outputting the port number signal from said order control memory means to said multiplexer means when said order control memory means stores the port number signal, and for outputting the first counter number from said counter means when there is no data in said order control memory means; and second counter means, operatively couples to said order control memory means, for generating a cyclic counter value which periodically indicates one of the input ports, and for writing the cyclic counter value into said order control memory means;

wherein when said order control memory means simultaneously receives a plurality of port numbers, said order control memory means outputs said simultaneously received plurality of port numbers in response to said cyclic counter value.

6. A switch having plural input ports and which selectively switches input data, received at a corresponding one of said input ports to an output port, said switch comprising:

a plurality of memories respectively connected to corresponding ones of said input ports of the switch, each of said memories comprising input acknowledgement signal generating means for generating an input acknowledgement signal in response to receipt of said input data;

multiplexer means, coupled between the plurality of memories and the output port of the switch, for connecting one of the memories to the output port in response to a port number signal;

synchronizing means for synchronizing input acknowledgement signals from the memories with each other and for outputting synchronized input acknowledgment signals;

order control memory means, coupled to said synchronizing means, for storing the synchronized input acknowledgement signals and outputting the synchronized input acknowledgement signals by a first-in first-out process;

coder means, coupled between said order control memory means and said multiplexer means, for sequentially generating the port number signal indicating one of the memories each time one of the synchronized input acknowledgement signals is read out from said order control memory means;

first counter means, coupled to said order control memory means, for generating a fist counter number which is incremented when there is not data in said order control memory means, said first counter number serving as the port number signal;

selector means, coupled to said order control memory means, said first counter means and said multiplexer means, for outputting the port number signal from said coder means to said multiplexer means when said order control memory means stores the port number signal and for outputting the first counter number from said counter means when there is no data in said order control memory means; and second counter means, coupled to said coder means, for generating a cyclic counter value which periodically indicates one of the input ports, and for outputting the cyclic counter value into said coder means;

wherein when said order control memory means simultaneously receives a plurality of port numbers, said order control memory means outputs said simultaneously received plurality of port numbers in response to said cyclic counter value from said coder means.

* * * * *

UNITED STATES PATENT AND TRADEMARK OFFICE
CERTIFICATE OF CORRECTION

PATENT NO. : 5,303,231
DATED : April 12, 1994
INVENTOR(S) : Tomohiro SHINOMIYA et al.

It is certified that error appears in the above-indentified patent and that said Letters Patent is hereby corrected as shown below:

Column 3  line 8, after "port" insert --#1--; after "port" delete ---#1--;

line 34, after "$26_1$-$26_N$" insert --,--;

line 35, delete ",".

Column 8,  line 19, change "number" to --numbers--;

line 37, delete "said";

line 39, delete ",".

Column 9,  line 22, change "not" to --no--;

line 34, change "couples" to --coupled--.

Column 10,  line 27, change "not" to --no--;

line 42, change "into" to --to--.

Signed and Sealed this

Twenty-seventh Day of September, 1994

Attest:

BRUCE LEHMAN

Attesting Officer  Commissioner of Patents and Trademarks